Nov. 22, 1955     E. B. ROBINSON ET AL     2,724,623
BEARING SEAL CONSTRUCTION FOR DRAWING ROLLS
Filed Jan. 19, 1953
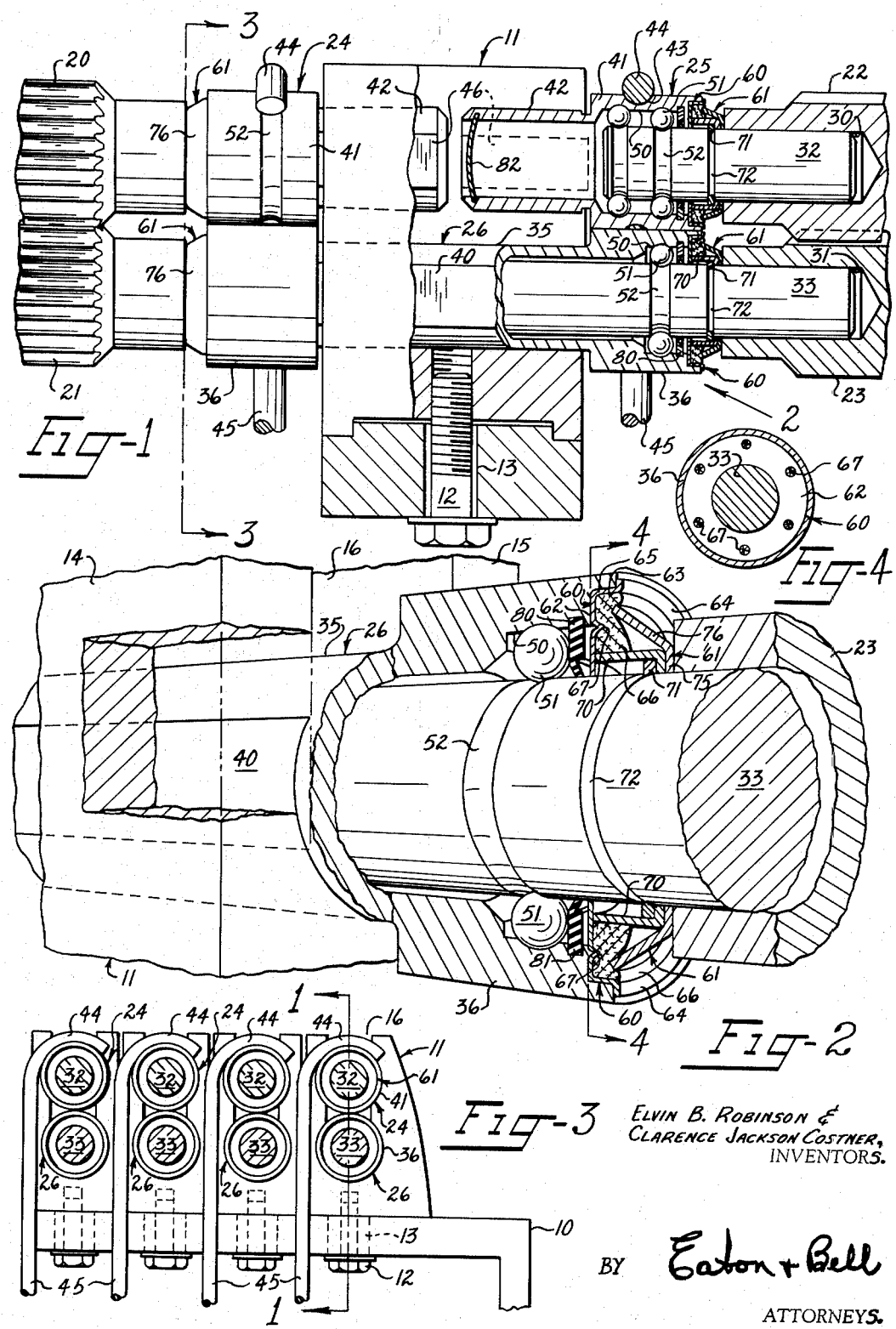
ELVIN B. ROBINSON &
CLARENCE JACKSON COSTNER,
INVENTORS.
BY Eaton + Bell
ATTORNEYS.

United States Patent Office 2,724,623
Patented Nov. 22, 1955

2,724,623

BEARING SEAL CONSTRUCTION FOR DRAWING ROLLS

Elvin B. Robinson, Gastonia, and Clarence Jackson Costner, Bessemer City, N. C., assignors to Ideal Industries, Inc., Bessemer City, N. C., a corporation of North Carolina Application January 19, 1953, Serial No. 331,858

6 Claims. (Cl. 308—187.1)

This invention relates to textile machinery and, more especially, to an improved bearing seal particularly adapted for use with anti-friction bearings associated with the roller necks or shafts of drawing rolls and the like, such as are used on drawing frames, spinning frames, twisters, roving frames and the like.

It is the primary object of this invention to provide an improved bearing seal for anti-friction or friction bearings, in which the roller necks or shafts of drawing rolls are mounted, which is so constructed as to prevent minute particles of lint and the like from entering the bearing housings due to the influence of static electricity and to also prevent lubricant from escaping from the bearing housings.

More specifically, it is an object of this invention to provide an improved bearing seal construction for drawing rolls and the like wherein the drawing rolls are provided with roller necks of smaller diameter than the rolls and which extend into a bearing housing. The improved bearing seal construction includes a shallow cup-shaped washer or inner annulus having a peripheral shoulder thereon which fits against one end of the bearing housing as the washer is inserted and the washer per se fits inside of the bearing housing and surrounds the roller neck of the drawing roll.

A resilient seal washer, preferably made from felt and preferably impregnated with a suitable lubricant, fits inside of the cup-shaped washer and its inner perpihery slidably and rotatably engages the outer perpihery of an annular snap-ring keeper which has an inwardly projecting annular flange on its outer end relative to the bearing housing which fits against the outer surface of a snap-ring carried by the roller neck.

The outer end of the snap-ring keeper is engaged by a radial circuit flange portion of a substantially frusto-conical outer washer which flares outwardly relative to the radial portion thereof and engages the outer surface of the annular resilient seal washer. The annular radial portion of the frusto-conical outer washer is engaged at its outer surface by the end of the corresponding drawing roll to thereby hold the same against the outer surface of the snap-ring keeper. The first-named cup-shaped washer has projections thereon which engage the felt washer and thereby maintain the felt washer in a stationary position relative to the housing during rotation of the roller neck and the drawing roll and whereby the snap-ring, the snap-ring keeper and the outer frusto-conical washer rotate with the drawing roll as the large free end of the frusto-conical washer is biased in engagement with the felt seal washer to thereby prevent lubricant from escaping from the bearing housing. Also, the cup-shaped washer and the frusto-conical washer are made from a non-ferrous material, such as brass and the like, and, thus, prevents static electricity from being created due to the relative rotational movement of the felt washer and the parts engaged thereby.

Some of the objects of the invention having been stated, other objects will appear as the description proceeds, when taken in connection with the accompanying drawings, in which—

Figure 1 is a fragmentary vertical sectional view taken substantially along the line 1—1 in Figure 3, but showing the proximal ends of corresponding upper and lower drawing or drafting rolls with the right-hand portions of the drawing rolls being shown in longitudinal section and the left-hand drawing rolls being shown in elevation and also, the left-hand portion of the bearing block is shown in elevation with the right-hand portion being broken away to show the manner in which the bearings are mounted therein;

Figure 2 is an enlarged fragmentary isometric view looking in the general direction of the arrow indicated at 2 in Figure 1, with parts broken away and parts in section to illustrate the improved bearing seal construction;

Figure 3 is a fragmentary vertical sectional view showing a group of roll bearing blocks and showing the manner in which the roller necks are mounted in the improved bearings and being taken substantially along the line 3—3 in Figure 1;

Figure 4 is a transverse sectional view taken substantially along the line 4—4 in Figure 2, showing the projections or sprags on the radial portion of the cup-shaped inner washer.

Referring more specifically to the drawing, for purposes of illustration, the improved seal construction for the bearings of the drawing rolls is shown in association with drawing rolls or drafting rolls of a drawing frame. It is to be distinctly understood, however, that the improved seal construction may be used in association with drawing rolls of any machine in which a drawing operation is performed such as spinning frames, twisters, roving frames, slubbers and the like, and friction bearings may also be employed in lieu of anti-friction bearings as illustrated in the drawings, without departing from the spirit of the invention.

In Figures 1 and 3, a part of one of the bearing stands of a drawing frame is broadly indicated at 10, to the upper surface of which a plurality of substantially U-shaped bearing blocks 11 are adjustably secured in laterally spaced relation to each other by means of corresponding screws 12 which penetrate elongated slots 13 in the frame portion 10. A plurality of said bearing stands and the corresponding bearing blocks 11 are spaced lengthwise of the machine, but only one of such bearing stands is shown in the drawing.

Each of the bearing blocks 11 has upstanding spaced portions 14 and 15 defining a substantially U-shaped cavity 16 in which bearing assemblies, to be presently described, are mounted for rotatably supporting the proximal ends of upper and lower drawing rolls. The upper and lower drawing rolls in the left-hand portion of Figure 1 are indicated at 20 and 21, respectively, and the upper and lower drawing rolls in the right-hand portion of Figure 1 are indicated at 22 and 23, respectively. Only the proximal ends of the upper rolls 20, 22 and the lower or bottom drawing rolls 21, 23 are shown in Figure 1. However, it is to be understood that the ends of the drawing rolls remote from those illustrated in Figure 1 may be rotatably supported in an identical manner to that shown in Figure 1.

The drawing rolls 20, 21, 22 and 23 are usually fluted lengthwise about the peripheries thereof and the bottom rolls 21 and 23 are driven by conventional means, not shown, to, in turn, impart rotation to the top rolls 20 and 22 due to inter-engagement of the fluted surfaces of the rolls. The proximal ends of the top rolls 20 and 22 are rotatably supported in respective bearing housings 24 and 25 and the proximal ends of the bottom drawing rolls 21 and 23 are rotatably supported in opposite ends of a common bearing housing generally designated at 26. Since the proximal ends of the top rolls 20 and 22 are supported in the identical manner and the proximal ends of the bottom rolls 21 and 23 are also supported in an identical manner, only the parts at the right-hand portion of Figure 1, associated with the top and bottom rolls 21 and 23, will be described in detail and like parts associated with the corresponding ends of the top and bottom rolls 20 and 21 shall bear the same reference characters with the exception of the top roll bearing housing 24.

It will be observed in the right-hand portion of Figure 1 that the ends of the top and bottom rolls 22 and 23 adjacent the bearing block 11 are provided with respective axial bores or cavities 30 and 31 in which corresponding ends of respective roller necks or shafts 32 and 33 are suitably secured, as by a pressed fit. Of course, as is well known, the proximal ends of the top rolls 20 and 22 are each provided with an individual shaft or roller neck such as the shaft 32 while the proximal ends of the bottom rolls 21 and 23 are connected in an identical manner to opposite ends of the shaft 33 which is common to the proximal ends of the bottom drawing rolls 21 and 23.

The shaft or roller neck 33 extends through the cavity 16 in the corresponding bearing block 11 and is loosely surrounded by the tubular bearing housing 26. The bearing housing 26 has a reduced central portion 35 and enlarged opposite end portions 36 which are disposed astride the bearing block 11. The medial portion 35 of the tubular bearing housing 26 usually rests upon the bottom of the cavity 16 defined by the upstanding portions 14 and 15 of the bearing block 11 and the reduced portion 35 is provided with flats 40 on opposite sides thereof which engage the proximal surfaces of the upstanding portions 14 and 15 to prevent rotation of the bearing housing 26. The flats 40 may be eliminated, if desired, because they are conventional.

The bearing housing 24 and 25 also each has enlarged outer portions 41 and a reduced inner portion 42, the proximal ends of the reduced inner portions 42 terminating in close proximity to each other in the corresponding cavities 16. The diameters of the enlarged end portions 36 and 41 of the respective bottom and top bearing housings 26 and 25 are preferably equal to the pitch diameter of the flutes formed in the peripheries of the drawing rolls 20, 21, 22 and 23. In order to urge the top rolls 20 and 22 into engagement with the bottom rolls 21 and 23, the enlarged portions 41 of the top roll bearing housings 24 and 25 are each provided with a peripheral groove 43 in which a hook portion 44 of a conventional weight bar 45 is positioned, a suitable weight, not shown, usually being provided and connected to the lower end of each of the weight bars 45.

The reduced portions 42 of top roll bearing housings 24 and 25 are also provided with flats 46 on opposite sides thereof which slidably fit in the corresponding cavities 16 to prevent rotation of the top roll bearing housings 24 and 25, but permit said housings to move upwardly and downwardly relative to each other and relative to the bearing block 11 according to the variations in thickness of the slivers or roving passing between the top and bottom drawing rolls. The flats 46 may be eliminated, if desired, as they are conventional.

The enlarged portions 36 and 41 of the respective housings 26 and 25 are each provided with a circular cavity or bore 50 in the outer end thereof which has one or more axially spaced circularly arranged rows of balls 51 therein, there being a single row of balls 51 illustrated in the enlarged portion 36 of the bottom roll bearing housing 26 shown in Figures 1 and 2 and two circularly arranged rows of the balls 51 are shown in the outer end of the top roll bearing housing 25, thus forming anti-friction bearing units or assemblies of each of the bearing housings 24, 25, and 26. The roller necks 32 and 33 are provided with peripheral grooves 52 which correspond to the circular rows of balls 51 and, since these circular rows of balls 51 are positioned in corresponding grooves in the walls of the bores 50, the circular rows of balls 51 thereby maintain the shafts 32 and 33 in the corresponding bearing housings.

Now, in order to prevent lint and other foreign matter from entering and collecting in each of the circular cavities or bores 50 of the bearing housings 24, 25 and 26 and to prevent the development of static electricity due to relative rotational movement between the shafts 32 and 33 and the corresponding housings 24, 25 and 26, we have provided an improved annular seal assembly disposed between the outer ends of the enlarged portions 36 and 41 of the corresponding bearing housings 24, 25 and 26 and the adjacent ends of the top and bottom rolls 20, 22, 21 and 23 which will now be described in detail.

Since the structure of the bearing seal assembly is the same for each of the rolls 20, 21, 22 and 23, only the annular bearing seal assembly shown in the lower right-hand portion of Figure 1 associated with the bottom roll 23 and the bearing housing 26 will be described in detail, since this is shown on an enlarged scale in Figure 2. Like reference characters will apply to all of the bearing seal assemblies disposed at the proximal ends of the top rolls 20, 22 and the bottom rolls 21, 23.

Each of the improved annular bearing seal assemblies comprises an inner annulus or cup-shaped washer broadly designated at 60 and an outer annulus or frusto-conical washer broadly designated at 61. Each of the annuli 60 and 61 is made from a non-ferrous material; preferably brass or aluminum. The inner annulus 60 serves primarily as a housing for the annular bearing seal assembly and comprises an annular radial portion 62, bent outwardly parallel to the axis thereof to form a peripheral outer wall 63 which extends outwardly in parallel relation to the axis of the cup-shaped member 60 and is then bent outwardly radially to form a shoulder portion 64.

The enlarged portion 36 of the housing 26 has a shallow circular cavity 65 therein which is of greater diameter than the diameter of the bore 50 and in which the cup-shaped member 60 is fixed, preferably by a light pressed fit, and, in which instance, the annular radial portion 62 fits against the bottom cavity or peripheral groove 65 and the flange or shoulder portion 64 fits against the outer end of the enlarged portion 36 of the housing 26.

A porous ring 66 of closely packed fibers, such as felt and the like, fits against the inner peripheral surface of the wall portion 65 of the cup-shaped member 60 and also fits against the outer surface of the annular radial portion 62 relative to the cavity or bore 50. The fibrous ring is preferably impregnated with a suitable lubricant. The inner diameter of the fibrous ring 66 is substantially greater than the diameter of the corresponding roller neck or shaft 33 and is held in fixed relation to the cup-shaped member 60 by means of a plurality of circularly arranged projections or sprags 67 formed on the outer surface of the annular radial portion 62 of the cup-shaped member 60.

An annular retaining member or snap-ring keeper 70 is positioned within the fibrous ring 66 and is adapted to slidably engage the inner surface of the fibrous ring 66. The retaining ring or snap-ring keeper 70 is preferably L-shaped in longitudinal section, as illustrated in Figures 1 and 2, thus providing a shoulder thereon which is adapted to engage a conventional snap-ring 71 positioned in a peripheral groove 72 provided therefor in the roller neck or shaft 33. The snap-ring 71 and the annular retaining member 70 may be made from ferrous metal, such as steel and the like, if desired.

Now, the most important feature of the present invention is the manner in which the outer annulus or frusto-conical member 61 is constructed. The outer annulus or frusto-conical washer 61 comprises a radial annular portion 75 which closely encircles the shaft or roller neck 33 and extends outwardly substantially equal to the height of the shoulder portion of the snap-ring keeper 70 and is then bent inwardly toward the bore 50, but outwardly at an angle relative to the axis of the shaft or roller neck 33 to form a frusto-conical portion 76 whose free end extends inwardly toward the bore 50 slightly beyond the outer surface of the flange or shoulder portion 64 of the cup-shaped inner annulus 60 and, thus, impinges against the outer surface of the annular fibrous ring 66 to cause the fibrous material from which the ring 66 is made to be more tightly compressed between the free end of the frusto-conical portion 76 of the outer annulus 61 and the bottom or annular radial portion 62 of the inner annulus or cup-shaped member 60 than it is at the portion thereof which engages the outer surface of the snap-ring keeper 70.

The fibrous material from which the ring 66 is made is preferably impregnated with a suitable lubricant and, thus, the outer annulus 61 not only assists in retaining said fibrous ring 66 in the housing formed of the inner annulus or cup-shaped member 60, but also prevents the lubricant with which the fibrous washer or ring 66 is impregnated from escaping. Of course, the fibrous ring 66 also prevents any lubricant within the corresponding bore 50 from escaping from the housing 26.

When the corresponding end of the bottom roll 23 is pressed onto the shaft or roller neck 33, the end of the drawing roll 23 bears against the outer surface of the annular radial portion 75 of the outer annulus or frusto-conical washer 61 and forces the same, along with the snap-ring keeper 70 toward the enlarged portion 36 of the bearing housing 26 until the keeper 70 engages the snap-ring 71.

A running clearance or tolerance is provided between the inner periphery of the annular radial portion or bottom 62 of the inner annulus or cup-shaped member 60 and the shaft or roller neck 33, and, therefore, the inner annulus or cup-shaped member 60 and the fibrous ring 66 remain stationary while the snap-ring 71, the snap-ring keeper 70 and the outer annulus or frusto-conical washer 61 rotate with the bottom roll 23 and the roller neck or shaft 33.

Since it is preferable that a suitable lubricant is placed in the bearing housing 24, 25, and 26 before the corresponding roller necks or shafts 32 and 33 are inserted therein or, at least, before the drawing rolls are mounted on the roller necks, a suitable lubricant seal or O ring 80 is provided in each of the cavities or bores 50, the wall of each of the cavities or bores 50 having a peripheral groove 81 therein which is spaced inwardly slightly from the outer end of the corresponding enlarged portion of each housing 24, 25, and 26 and in which the corresponding O ring 80 is positioned. The O rings 80 are preferably made from rubber or a synthetic material such as neoprene.

Thus, the O ring 80 assists in preventing lubricant from escaping from the housings 24, 25 and 26 to the corresponding bearing seal assemblies including the parts 60, 61 and 66. Since the proximal ends of the top roll bearing housings 24 and 25 are spaced from each other, the reduced portions 42 of each of the top roll bearing housings 24 and 25 has a suitable closure 82 on the inner end thereof to prevent lubricant from escaping therefrom.

It is thus seen that we have provided an improved bearing seal assembly for the roller necks of drawing rolls wherein the fibrous ring 66 is pressed inwardly toward the inner annulus 60 by the free edge of the frusto-conical portion 76 of the outer annulus 61 thus preventing lubricant from escaping from the lubricant impregnated fibrous ring 66 and also assisting in preventing lubricant from escaping from the housings 24, 25, and 26. Also, since the inner and outer annuli 60 and 61 are made from a non-ferrous material and the roller necks and the corresponding top and bottom rolls rotate with the outer annuli 61 relative to the corresponding bearing housings 24, 25 and 26 and the inner annuli 60, the inner and outer annuli 60 and 61 serve as shields to prevent static electricity from being created by the relatively rotating parts. Thus, lint and the like is prevented from working its way through the fibrous seal ring 66 as has heretofore been the case, and which, heretofore, has ultimately permitted the particles of lint to pass through the fibrous ring 66.

In the drawings and specification there has been set forth a preferred embodiment of the invention and, although specific terms are employed, they are used in a generic and descriptive sense only, and not for purposes of limitation, the scope of the invention being defined in the claims.

We claim:

1. A bearing seal for the roller necks of drafting rolls and the bearings therefor, wherein the bearing for each roll end is provided with a circular cavity penetrated by the roller neck of the drafting roll, comprising an inner annulus having an annular radial portion and an axially extending wall portion integral with the outer periphery of said annular radial portion, the inner periphery of the said annular radial portion closely encircling the roller neck, a resilient porous ring encircling said roller neck and being disposed within the axially extending wall of said inner annulus, the annular radial portion having projections formed in the outer surface thereof against which the porous ring fits, the proximal end of said drafting roll being spaced from the outer end of said bearing, an outer annulus having an annular radial portion encircling said roller neck and being adapted to rotate in fixed relation with the roller neck and the corresponding drafting roll, a substantially frusto-conical portion integral with the annular radial portion of said outer annulus and having a large end remote from the annular radial portion of the outer annulus, and the large end of said outer annulus being so positioned relative to the inner annulus as to compress the resilient porous ring at its point of contact therewith and at a point radially inwardly of the periphery of the porous ring.

2. A bearing seal for the roller necks of drafting rolls and the bearings therefor, wherein the bearing for each roll end is provided with a circular cavity penetrated by the roller neck of the drafting roll, comprising an inner annulus having an annular radial portion and an axially extending wall portion integral with the outer periphery of said annular radial portion, the inner periphery of the said annular radial portion closely encircling the roller neck, a resilient porous ring encircling said roller neck and being disposed within the axially extending wall of said inner annulus, the proximal end of said drafting roll being spaced from the outer end of said bearing, an outer annulus having an annular radial portion encircling said roller neck and being adapted to rotate in fixed relation with the roller neck and the corresponding drafting roll, a substantially frusto-conical portion integral with the annular radial portion of said outer annulus and having a large end remote from the annular radial portion of the outer annulus, the large end of said outer annulus being so positioned relative to the inner annulus as to compress the resilient porous ring at its point of contact therewith and at a point radially inwardly of the wall of the inner annulus, and the inner and outer annuli being made from a non-magnetic material to prevent static electricity from being developed therebetween.

3. A bearing seal for the roller necks of drafting rolls and the like and the bearings therefor wherein the bearing for each roll end is provided with a circular cavity at its end adjacent the corresponding drafting roll and being penetrated by the roller neck of the drafting roll; said bearing seal comprising an inner annulus fixed in the outer end of the bearing cavity and having an annular wall portion projecting toward the adjacent end of the drafting roll, an annular snap-ring keeper of less external diameter than the internal diameter of the annular wall of the inner annulus surrounding said roller neck, a snap-ring positioned about the roller neck and spaced axially from the inner annulus and being disposed closely adjacent the proximal end of said drafting roll, said snap-ring keeper having an inwardly projecting annular flange and being substantially L-shaped in longitudinal section and forming a shoulder thereon engaging the outer surface of said snap-ring relative to the inner annulus, a fibrous ring encircling said annular snap-ring keeper and having its outer periphery disposed within the confines of the annular wall of said inner annulus, means maintaining the fibrous ring in fixed relation to the inner annulus, an outer annulus including an annular radial portion engaged at its end adjacent the inner annulus by said flange of the annular snap-ring keeper and being engaged at its outer end by the proximal end of said drafting roll, said outer annulus also having a frusto-conical portion flaring outwardly from the annular radial portion thereof toward the inner annulus, and the distance between the inner annulus and the adjacent end of the frusto-conical portion of the outer annulus being such that the fibrous ring is compressed between the inner annulus and the adjacent end of the outer annulus.

4. A bearing seal for the roller necks of drafting rolls and the like and the bearings therefor wherein the bearing for each roll end is provided with a circular cavity at its end adjacent the corresponding drafting roll and being penetrated by the roller neck of the drafting roll; said bearing seal comprising an inner annulus fixed in the outer end of the bearing cavity and having an annular wall portion projecting toward the adjacent end of the drafting roll, an annular snap-ring keeper of less external diameter than the internal diameter of the annular wall of the inner annulus surrounding said roller neck, a snap-ring positioned about the roller neck and spaced axially from the inner annulus and being disposed closely adjacent the proximal end of said drafting roll, said snap-ring keeper having an inwardly projecting annular flange and being substantially L-shaped in longitudinal section and forming a shoulder thereon engaging the outer surface of said snap-ring relative to the inner annulus, a fibrous ring encircling said annular snap-ring keeper and having its outer periphery disposed within the confines of the annular wall of said inner annulus, means maintaining the fibrous ring in fixed relation to the inner annulus, an outer annulus including an annular radial portion engaged at its end adjacent the inner annulus by said flange of the annular snap-ring keeper and being engaged at its outer end by the proximal end of said drafting roll, said outer annulus also having a frusto-conical portion flaring outwardly from the annular radial portion thereof toward the inner annulus, the distance between the inner annulus and the adjacent end of the frusto-conical portion of the outer annulus being such that the fibrous ring is compressed between the inner annulus and the adjacent end of the outer annulus, and said inner and outer annuli each being made from a non-magnetic material to prevent static electricity from being developed therebetween during rotation of the roller neck, the snap-ring, the keeper, the drafting roll and the outer annulus relative to the inner annulus, the bearing and the fibrous ring.

5. A bearing seal for the roller necks of drafting rolls and the bearings therefor, wherein the bearing for each roll end is provided with a circular cavity penetrated by the roller neck of the drafting roll, comprising an inner annulus having an annular radial portion fixed in said cavity, the inner periphery of the said annular radial portion closely encircling the roller neck, a resilient porous ring encircling said roller neck and being disposed against the outer surface of the radial portion of said inner annulus, the outer surface of the inner annulus having projections, means to hold said porous ring in fixed relation to the inner annulus, the proximal end of said drafting roll being spaced from the outer surface of said inner annulus, an outer annulus encircling said roller neck and being adapted to move in fixed relation with the roller neck and the corresponding drafting roll, said outer annulus including a substantially frusto-conical portion having its large end remote from the proximal end of the drafting roll, and the large end of said outer annulus being so positioned relative to the inner annulus as to compress the resilient porous ring at its point of contact therewith and at a point radially inwardly of the outer periphery of the porous ring to press the porous ring against said projections.

6. A bearing seal for drafting rolls and the bearing thereof wherein the bearing for each roll end includes a circular cavity penetrated by the roller neck of a drafting roll comprising an inner annulus fixed in the outer end of the bearing cavity, an outer annulus fixed on the proximate end of the drawing roll, said inner annulus having an axially extending flange spanning the distance between said inner and outer annuli, a porous lubrication ring positioned about said roller neck and confined between the inner and outer annuli, a snap ring positioned about the roller neck, a retaining member positioned about the roller neck and held in position by the snap ring and having an axially extending portion positioned between the porous ring and the roller neck, the inner and outer annuli being formed of non-magnetic material to prevent static electricity from being formed therebetween.

References Cited in the file of this patent

UNITED STATES PATENTS

| | | |
|---|---|---|
| 2,237,004 | King | Apr. 1, 1941 |
| 2,250,167 | Niles et al. | July 22, 1941 |
| 2,465,634 | Collins | Mar. 29, 1949 |